United States Patent [19]

Rakes

[11] Patent Number: 4,990,209

[45] Date of Patent: Feb. 5, 1991

[54] SELF PROPELLED PIPE FUSION MACHINE

[76] Inventor: George C. Rakes, 2120 Fairway Dr., Bozeman, Mont. 59715

[21] Appl. No.: 451,315

[22] Filed: Dec. 15, 1989

Related U.S. Application Data

[63] Continuation of Ser. No. 879,589, Jun. 27, 1986, abandoned.

[51] Int. Cl.$^5$ ............................................. B32B 31/00
[52] U.S. Cl. ...................................... 156/351; 156/359; 156/362; 156/366; 156/498; 156/499; 156/503; 156/574
[58] Field of Search .................. 156/158, 304.2, 304.6, 156/498, 502, 351, 359, 503, 362, 366, 574, 499

[56] References Cited

U.S. PATENT DOCUMENTS

| | | | |
|---|---|---|---|
| 2,791,198 | 5/1957 | Cummings | 156/498 |
| 3,729,360 | 4/1973 | McElroy | 156/499 |
| 3,744,259 | 7/1973 | Wagley | 61/72.5 |
| 3,900,146 | 8/1975 | Fowler | 228/103 |
| 4,286,914 | 9/1981 | Davidson, Jr. | 414/460 |
| 4,352,708 | 10/1982 | McElroy | 156/378 |

FOREIGN PATENT DOCUMENTS

| | | | |
|---|---|---|---|
| 2041808 | 2/1972 | Fed. Rep. of Germany | 156/498 |
| 0173618 | 10/1983 | Japan | 156/366 |

OTHER PUBLICATIONS

"New Pipe Joining Method Will Benefit Distribution Industry"; Pipeline Digest; May 1984.

Primary Examiner—William J. Van Balen
Assistant Examiner—J. Davis
Attorney, Agent, or Firm—Reed Smith Shaw & McClay

[57] ABSTRACT

A self propelled enclosed apparatus for coupling sections of plastic pipe by fusion together to form a pipe line. The apparatus comprises a housing having a forwardly extending boom or trough for receiving pipe sections. Pipe sections are loaded onto the boom and fed to a fusion machine in the housing. The fusion machine is provided with hydraulically operated clamps and rollers to align and hold a section of pipe in mating relationship with a pipeline and a heating plate for forming a fused joint between the pipe section and the pipeline. Cooling apparatus is provided at the joint to reduce its temperature following fusion. Kick out rollers are provided, and the fused togehter pipeline exits the apparauts to a trialer towed thereby to be laid on the earth's surface or in trench. The trailer, self propelled apparatus, and boom are equipped with pipe support members to provide strain relief on the joint during fusion. The apparauts is self contained and all functions other than loading the pipe sections onto the forwardly extending boom are carried out within the machine by a driver-operator.

13 Claims, 4 Drawing Sheets

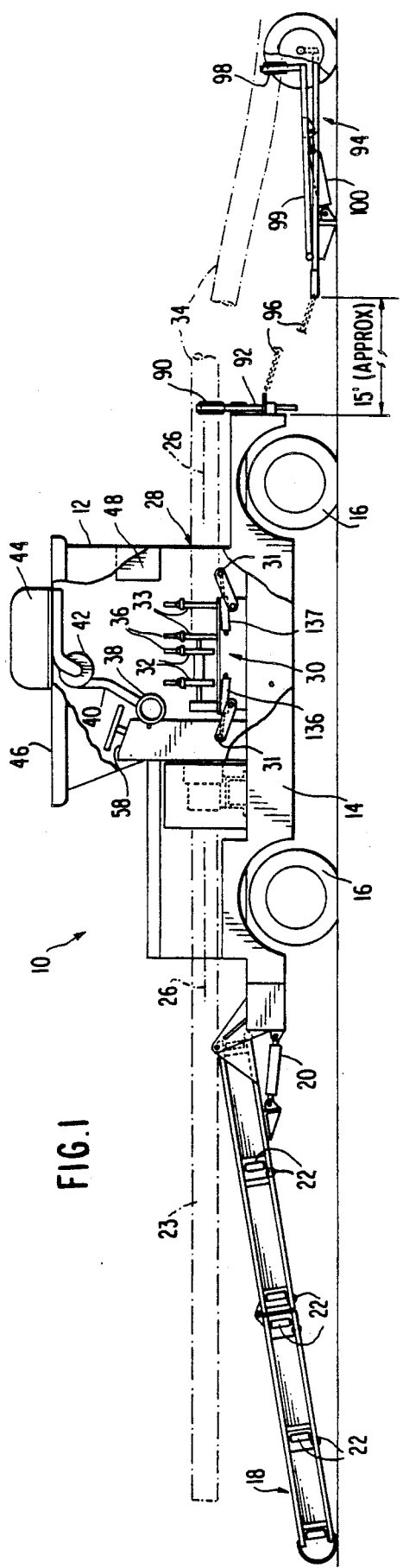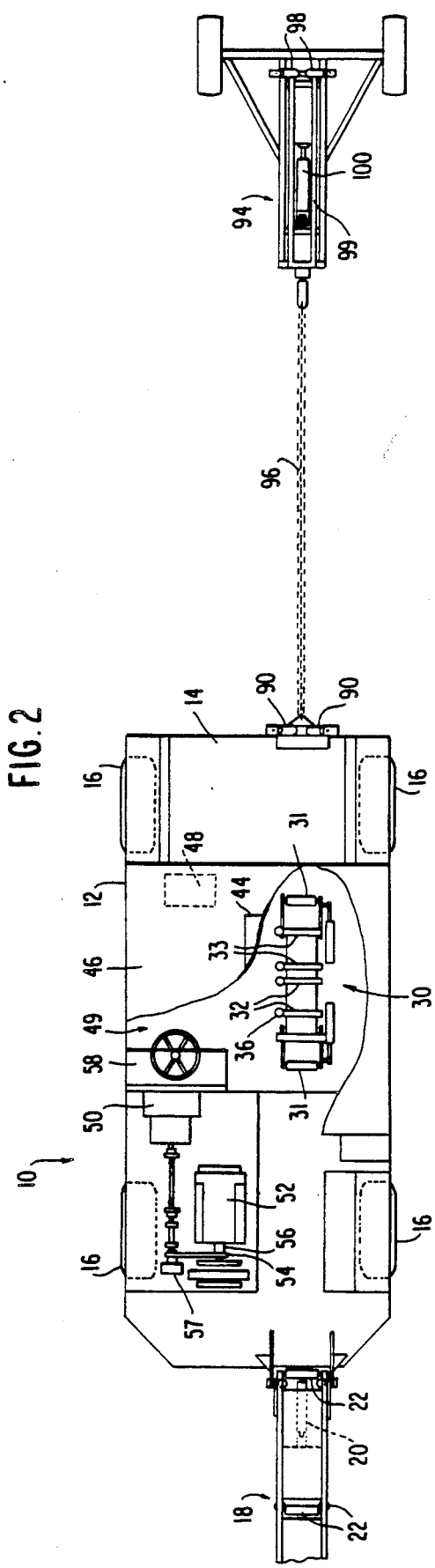

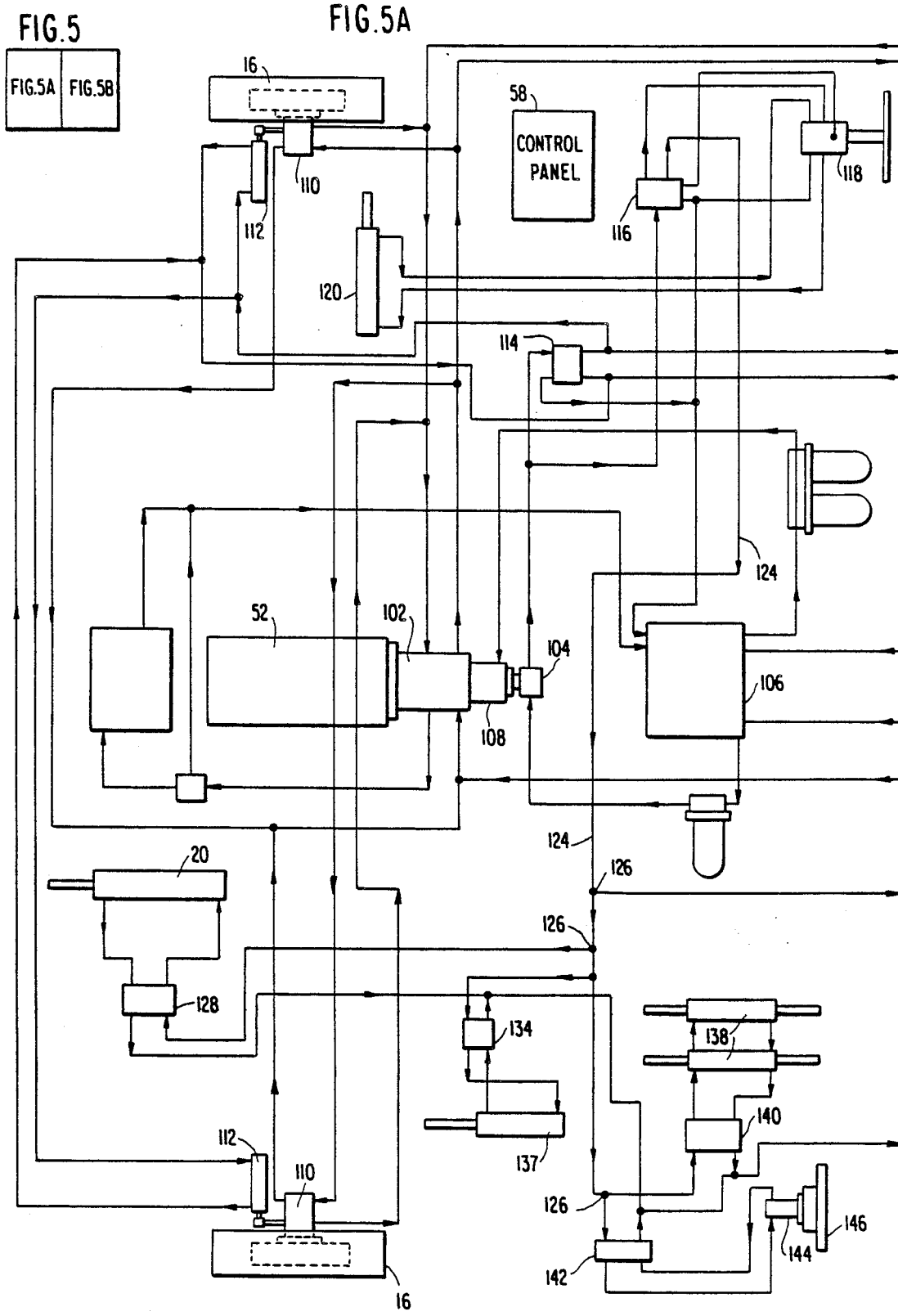

SELF PROPELLED PIPE FUSION MACHINE

This is a continuation of copending application Ser. No. 06/879,589, filed on June 27, 1986, now abandoned.

BACKGROUND OF THE INVENTION

Field of the Invention and Prior Art

This invention consists of a self propelled machine designed to join sections of pipe made out of thermo plastic materials such a polyethylene together to form a pipeline. Piping of this kind has been used to construct pipelines for the transportation of natural gas, sea water, and other fluids. All kinds of weather conditions may be encountered from extreme heat to extreme cold during the construction process. Pipe used to form these lines ranges in internal diameter size from four to over sixty inches (internal pipe size-IPS) and it comes in various wall thickness (standard dimensional ratio-SDR).

Sections of the pipe are joined together end-to-end either on the surface of the earth or in trenches to form a line. In general, heat is applied to the pipe sections at their ends which permits fusion. A British firm, for example, is reported to use polyethylene socket fittings incorporating electrical resistance heating elements to fuse pipe sections together in a trench. The pipe sections are fitted together at the socket and the heating elements are connected to a source of electricity such as a generator located adjacent to the trench. When energized, the heating elements cause the plastic to melt at the pipe interface such that pipe sections fuse together. The joints are cooled naturally. Labor is required to align and fit pipe sections together end-to-end, hold them in abutting relationship, and to operate the fusion equipment.

Portable fusion equipment has also been used to construct a pipeline. See U.S. Pat. No. 4,342,708 issued Oct. 5, 1982 to Arthur H. McElroy. McElroy Manufacturing, Inc., of Tulsa, Okla., for example, manufactures a fusion machine mounted on wheels like a cart such that it can be dragged by a tractor or other vehicle. The machine is equipped with screw down clamps or jaws which are used to hold a pipe section in juxtaposition with a pipe line and with a device to move the pipe section coaxially with the pipeline to perform the fusion operation. A facing cutter is part of the McElroy equipment and is used to trim the facing ends of the pipe section and the pipeline to make them parallel. A heater plate is carried on the cart such that it may be positioned to apply heat to melt the plastic and form a joint. Like the British apparatus, the cart mounted fusion operation is performed in the open or under tents, haulage equipment is required for the fusion machine, the pipe joints are subject to the elements during the fusion operation, and joint cooling occurs naturally.

The prior art also discloses self propelled machines used for forming metal pipelines, as represented by following:

| U.S. Pat. No. | Inventor | Date |
| --- | --- | --- |
| 3,744,259 | Wagley | July 10, 1973 |
| 3,900,146 | Fowler | August 19, 1975 |
| 4,286,914 | Davidson, Jr. | September 1, 1981 |

Wagley, for example, discloses a crawler mounted housing within which sections of metal pipe are supported and welded together to form a pipeline. The Fowler apparatus is similar using a number of housing units connected together to form a train. Both patents indicate that apparatus of the kind disclosed are useful in extreme climates whether cold (such as the artic) or hot (temperatures exceeding 90° F.). Wagley points out that extreme temperatures affect both the efficiency of the workmen and the metalurgical properties of the welds. Davidson discloses means for keeping pipe sections aligned during the pipeline forming process.

Nothwithstanding the state of the prior art, it has been common practice to construct pipelines using sections of polyethylene or poly pipe either by towing or dragging a fusion apparatus such as McElroy's machine in the direction of construction or by using heating elements as discussed above. In either event, the job of constructing the pipe line is both labor and equipment intensive. Generators are required to supply energy to the fusion apparatus and towing means are necessary for hauling it and the generators. Similarly, generators must be towed in the resistance heating unit situation. Lifting apparatus is usually necessary for larger diameter pipe and it too must be hauled or self propelled. In addition, weather conditions including extreme temperatures affect the ability or inability to perform pipeline construction operations. Further, fusion joints are affected by blowing dirt, dust, seeds, rain, and the like which adversely affect their integrity with potential adverse consequential results to the pipeline.

SUMMARY OF THE INVENTION

The present invention overcomes the disadvantages inherent in the prior art apparatus for forming a pipeline out of sections of thermo plastic pipe by making fusion joints. It does this by incorporating all the necessary apparatus and machinery into one self-propelled machine thereby increasing the efficiency of operation, reducing the number of machines and labor used by prior art methods, while increasing the speed of the pipeline construction operation. It is a principal object of this invention to provide a self propelled, self contained pipe fusion machine including heating and cooling apparatus for forming a pipeline out of thermo plastic, e.g., polyethylene, pipe sections.

It is another object of this invention to provide a self-propelled pipe fusion apparatus having a movable pipe pickup boom or trough extending from the front of the housing to reduce the number of persons and machines needed for constructing a pipeline.

It is yet another object of this invention to provide a trailer connected to the self propelled machine to be towed thereby with movable elements to support a pipeline and for laying same while cooperating with a pipe pickup boom to assist in maintaining the pipe aligned and strain relieved inside the fusion machine.

It is an additional object of this invention to provide the pipe fusion apparatus with individually controlled hydraulic clamps or jaws to reduce operator fatigue, to compensate for out-of-round pipe, and to maintain even pressure on the pipe during the fusion process and kick out rollers to lift the completed pipeline out of the fusion apparatus to avoid damage to the pipeline.

BRIEF DESCRIPTION OF THE DRAWINGS

FIG. 1 is a side elevation of the pipe fusion machine;
FIG. 2 is a top elevation of the pipe fusion machine.

FIG. 5, 5A and 5B are schematic diagrams of the hydraulic operating and propulsion circuits for the machine.

DETAILED DESCRIPTION OF PREFERRED EMBODIMENT

Figure 3:
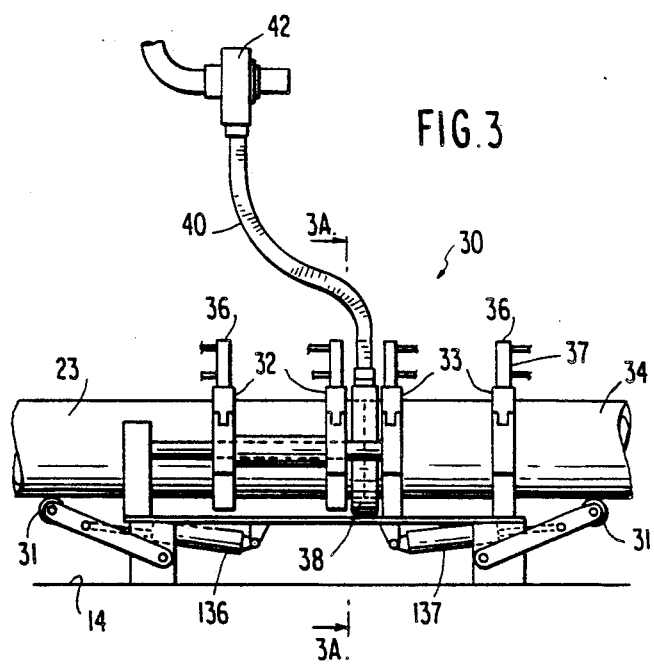
FIGS. 3 and 3A are detail views showing the fusion apparatus used with the machine.

Referring to FIGS. 1 and 2 of the drawing, the pipe fusion machine 10 includes a housing 12 supported on a frame 14 for movement on wheels 16. A pipe entry boom or trough 18 is supported for vertical movement at the front end of the frame. The boom is moved with respect to the ground by a hydraulically operated piston mounted in a cylinder 20 such that the pipe trough can be positioned as low as ground level, if necessary, depending on the size of pipe being used to form a pipeline. The boom or trough is provided with spaced apart rollers 22 along its length to facilitate movement of individual sections of pipe 23 into the housing 12. The rollers could be of the driven or powered kind.

The housing is provided with a pipe entry port on its front wall aligned along a pipe axis 26 with the boom or trough 18 and a pipeline exit port 28 located in the back wall of the housing. A modified McElroy fusion machine 30 is supported within the housing 12 in alignment with the pipe entry and exit ports on the pipe axis 26. The fusion apparatus 30 is generally of the kind described in U.S. Pat. Nos. 4,352,708 issued Oct. 5, 1982 and 3,729,360 issued Apr. 14, 1973 to A. H. McElroy.

Referring to FIGS. 1 and 3, the fusion apparatus is provided with three or more pipe clamps 32 and 33 which are described as "jaws" in U.S. Pat. No. 4,352,708. The clamps are spaced apart along the pipe axis 26 and at least one clamp is mounted for coaxial movement along the axis. A section of pipe 23 may be clamped by the jaws 32 and moved along the axis 26 such that its facing end may be juxtaposed with the facing end of a pipeline 34 held in the jaws 33 of the fusion apparatus.

In the preferred embodiment, each of the clamps 32 and 33 is provided with a hydraulically powered closure operator 36 which is used in lieu of the hand operated screws or knobs provided with the McElroy appartus. Each closure operator 36 consists of piston operable within a cylinder 37 (FIG. 5) between fully closed and fully open positions by a valve 39 controlled by an electrical actuator coil. Accordingly, the same pressure is applied to the pipe section and pipeline for each fusion operation thereby assuring proper alignment for each joint made. The hand knobs or screws provided with the McElroy appartus by contrast permit variable pressure on the pipe section and pipeline as may occur from operator fatigue, out-of-round pipe, and other variables. Such variables may affect the integrity of pipe joints. The hand knob operation is also materially slower.

Figure 3A:
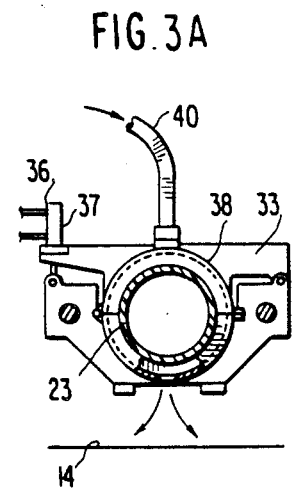

The fusion apparatus 30 of FIGS. 3 and 3A as supplied by McElroy is provided with a facer element or shaver for shaving the facing ends of the pipe 23 and the pipeline 34 to make them parallel, and it is provided with a resistance heating element from which heat is applied to the facing ends to melt them such that they can be fused together to form a joint. All fusion methods and machines that I am aware of allow the joint to cool naturally. In the preferred embodiment cooling air is supplied to the fused joint from an adjustable heat dissipator collar or band 38 attached by a hose 40 to a blower fan 42. The blower fan is attached to receive cooling air from an air conditioner 44 supported on the roof 46 of the housing 12. The heat dissipator band comprises two hollow semi circular channel elements pivotally joined together at one end so that they may be brought together and closed around a fusion joint so as to form a collar such that cooling air can be applied when the blower is actuated. The band is provided with an opening at the end opposite the hinge to allow the cooling air to exit. Different sized bands may be used with the hose for different sizes of pipe.

In the preferred embodiment, the motor for blower fan 42 is connected in an electrical timing circuit which is mounted in a timer box 48 located on the rear inside wall of the housing 12 at an operator's station 49.

As shown in FIG. 2, an alternator 50 is driven by the engine 52 through a belt 54 operating off a drive shaft 56 through a centrifugal clutch 57. The alternator is the principal source of electricity for the machine and is used to operate the air conditioner, the heating element for the fusion apparatus, lighting, the blower fan, and other purposes.

Figure 4:
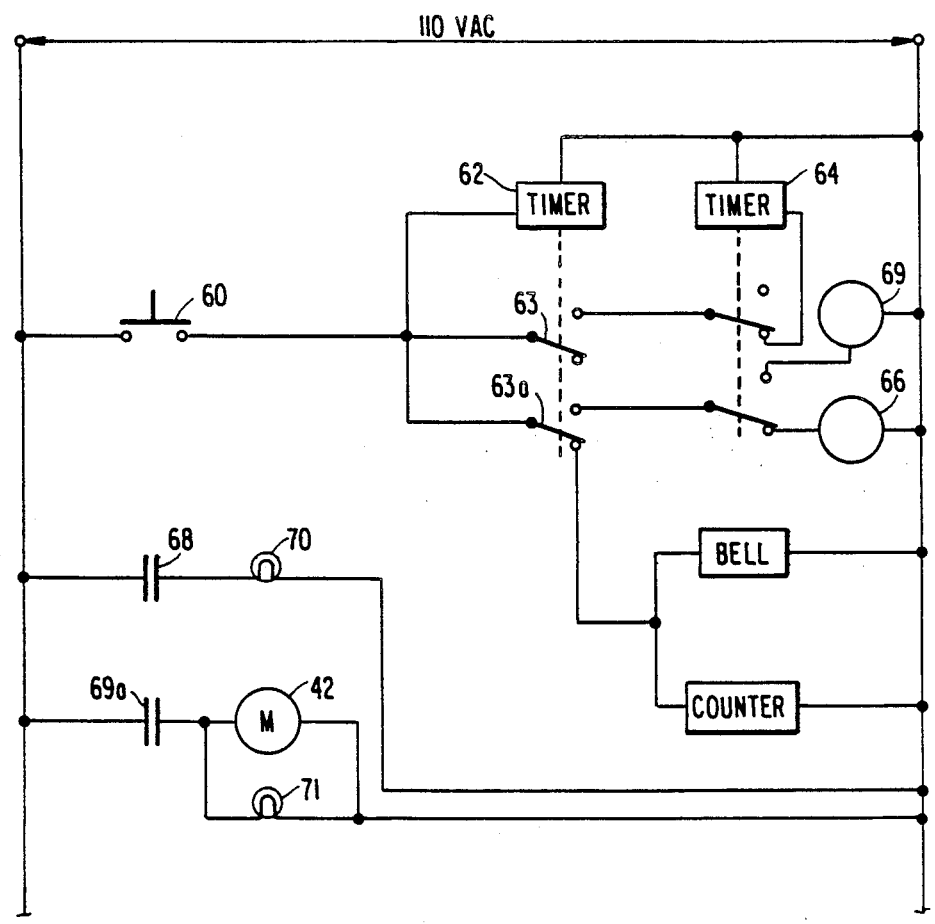
FIG. 4 is a wiring schematic of an electrical timing circuit.

Referring now to FIG. 4, a timing circuit of the kind which may be employed is shown connected to be energized from the alternator. Essentially, a first timer mechanism is used for the heating or pipe fusing operation and it is also used to initiate the cooling operation while a second timer mechanism is employed to control the length of time for the cooling cycle. As will be appreciated, various kinds of timing devices may be used to achieve the desired result.

In the circuit shown in FIG. 4 a push to start button 60 is connected to energize a first timer 62 which can be set for the combined fusing and cooling operations. When timer 62 energizes its switch contacts 63 and 63a close to supply line voltage to a second timer 64 and relay 66. Relay 66 has a pair of contacts 68 which make to apply power to a light 70 to indicate a fusion operation. The second timer is set to operate at the end of the heating or fusion cycle so as to switch line power from relay 66 to cooling relay 69. Contacts 69a for the cooling relay are connected to supply power to the blower fan 42 and an indicator lamp 71, and this circuit is deenergized when timer 62 times out. In the preferred embodiment, a bell and counter are connected to be operated when timer 62 times out. The bell and counter both perform single operations, i.e., the bell sounds for a predetermined interval and shuts off while the counter may be of any kind which can advance one step each time it is operated, i.e., operation of timer 62, and it is used to count joints made.

The pipe fusion-laying machine is, of course, held stationary during the pipe fusion or joint making operations. Referring again to FIGS. 1 through 3, once the fusion operation is completed the closure operators 36 are actuated to open the clamps or jaws 32 and 33 thus releasing the completed section of pipeline. In the preferred embodiment, kickout rollers 80 and 82 are provided at the front and rear of the McElroy apparatus 30. These rollers are supported by hydraulically operated pistons and during the fusion operation are in the down position. Once the fusion operation is completed, the machine operator can actuate the pistons by operating electrically controlled actuators to cause the rollers to rise and kick the pipeline out of the apparatus 30.

During the construction operation the pipeline 34, as shown in FIG. 1, is supported by a roller 90 mounted on a slide supported, for example, by a hollow member such as a pipe 92, fixedly mounted at the rear of the frame 14. The roller may be adjusted and locked in place in the vertical direction to allow for different sizes of pipe which may be used in constructing pipeline 34. It will be appreciated that the mechanical support provided by roller 90 and its support assembly cooperates with that provided by the rollers used on the boom or trough 18 to relieve strain tension on the pipe and pipeline at the joint while the fusion operation is performed.

In the preferred embodiment additional strain relief is obtained by using a trailer 94 to support the pipeline 34. The trailer is connected by a chain 96 or similar tow to the frame 14 and is pulled by the machine 10 as the latter moves forward along the right of way for the pipeline. The trailer is provided with a V roller 98 to support the pipeline 34 and assist in laying it on the right of way or in a trench. The roller 98 may be moved vertically under the control of the fusion machine operator by support member 99 attached to a piston mounted in a hydraulically operated cylinder 100. It will be appreciated that the height of the roller 98 may be adjusted relative to the height of the boom or trough 18 at the front of the pipe fusion machine 10 and the roller 90 mounted at the rear of the frame to allow for changes in ground elevation, e.g., while moving the machine down or up a hill, along the right of way for pipeline. A trailer is used in the preferred embodiment to provide flexibility for horizontal changes in the direction of the pipeline as well as vertical changes.

It will also be appreciated that all operations associated with the fusion process with the exception of the operation of feeding sections of pipe 23 into the pipe boom or trough 18 can be performed by one person working in the vicinity of the control console 58 inside the housing 12. That is because the engine 56 provides the power source to operate all systems associated with the pipe fusion-laying machine. This in turn means the operational controls for the fusion apparatus, boom, rollers and trailer, may be located adjacent to the controls for propelling and steering the machine. The preferred embodiment uses a hydrostatic drive to propel the machine and the hydraulic system associated therewith is also used to provide operational control for the fusion process.

Figure 5B:
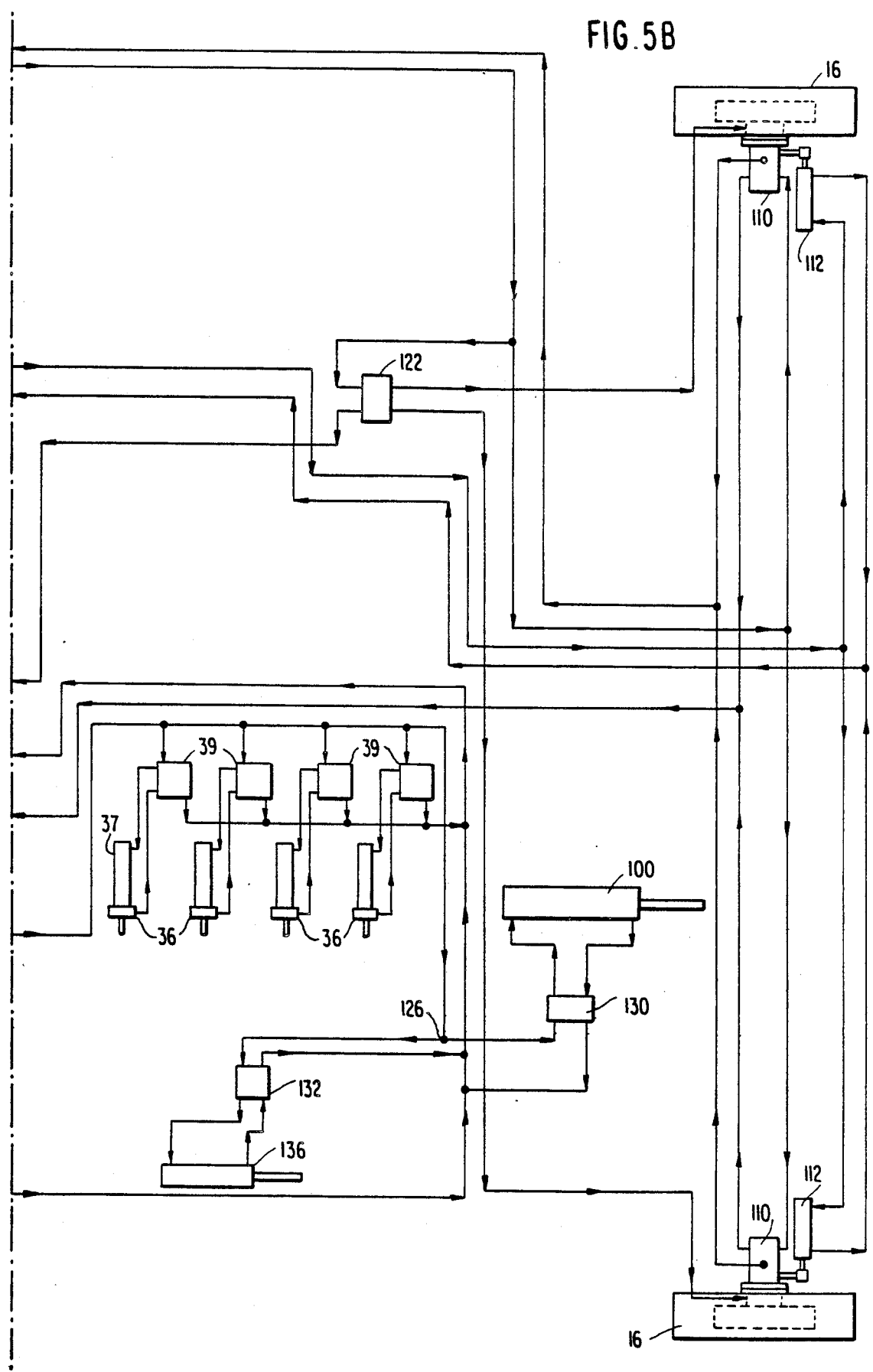

The hydraulic propulsion and operational circuit is shown in schematic form in FIG. 5, 5A and 5B of the drawings. Referring to FIG. 5, the propulsion system is driven by the engine 56 which, e.g., may be a commercially available diesel engine rated at 60 hp, to drive a variable volume hydraulic pump 102. The engine also drives a second hydraulic pump 104 used for the operational system. A single reservoir 106 supplies hydraulic fluid to operate an exciter or charge pump 108 for pump 102 and to supply fluid to pump 104.

The propulsion system is conventional, and in the preferred embodiment each wheel 16 is driven by a hydraulic motor 110. Two speed ranges are provided, a high range for highway travel and a low range for pipe fusing operations, using speed selectors 112 to control the range for each motor 110. Speed selection for the four wheel motors may be obtained from an electrically operated range selector valve 114 located in the hydraulic operational circuit.

The steering is hydraulically controlled using a priority valve 116 located in the operations circuit which valve is connected through the usual steering control 118 to provide fluid to a power steering operating cylinder 120. The rear wheels are supplied with hydraulic fluid from the propulsion circuit through a control valve 122 which valve operates automatically to brake the machine in the event of loss of fluid.

The operational hydraulic circuit includes the pump 104 which supplys fluid to priority valve 116. In the preferred embodiment, priority valve 116 is operated by an electrically powered coil actuator with the operating switch located at the control panel 58. In the preferred embodiment, the electrically powered coil actuators are connected to the machine's 12 VDC battery supply system which is also used in the conventional sense to obtain power for the machine, although 110 VAC valve actuators energized from the generator could be used in place of the 12 volt actuators. This system permits centralization of the controls at the control panel 58.

Parallel connected hydraulic operational circuits are on the output side of the priority valve 116 and include all hydraulically operated elements for the pipe fusion machine. The circuit 124 is shown branched in FIG. 5, at junction 126, to provide fluid to an operating valve 128 for the pipe trough operating cylinder 20, to a valve 130 supplying fluid to cylinder 100 to adjust the height of the roller on trailer 94, and to valves 132 and 134 connected to cylinders 136 and 137 respectively for operating the kickout rollers 80 and 82 at the front and rear of the McElroy fusion apparatus. In the preferred embodiment valves 128 for operating the pipe trough and 130 for controlling the height of pipe roller 98 on the trailer are of the standard return type, and levers located at or adjacent to the machine operator's console 58 are used to give continuous control over the amount of fluid supplied to the cylinders 20 and 100 respectively.

The pipe positioning members provided on the trough and trailer are in addition to pipe position and axial force alignment members 138 provided on the McElroy apparatus. The members 138 are controlled through valve 140 which is also provided with the McElroy apparatus. Valve 140 is shown connected to receive fluid at junction 126. Also connected to the junction is valve 142 which is provided in the McElroy apparatus and is used to supply fluid to a hydraulic motor 144 used to drive the pipe shaving wheel 146 on that apparatus. Similarly, the operating cylinders 37 for the clamps or jaws 32 and 33 on the McElroy are operated by coil activated valves 39 connected to junction 126.

Best Mode of Operation

The pipe fusion laying machine of the preferred embodiment uses only two men, a machine operator and a laborer, to fuse sections of pipe into a pipeline using pipe sections of up to 10 inch IPS, SDR 17 in size. The self propelled fusion machine is capable of fusing larger pipe sizes although additional labor may be necessary to feed sections of pipe into trough. Referring to FIGS. 1 and 5, the machine operator positions the boom or pipe trough 18 vertically relative to the ground by operating valve 128 using the valve operating lever so that a laborer can load a section of pipe 23 thereon and move it on rollers 22 into the housing 12 through entry port 24 and into the fusion apparatus 30.

Prior to positioning the boom, the machine operator moved the fusion machine forward along the pipeline such that a previously joined section of pipeline 34 is propelled on rollers 90 and 98 rearwardly of the machine. The use of individual hydraulic motors to drive the wheels 16 permits the machine operator to position the machine 10 precisely thereby allowing a pipe section 23 to be positioned precisely relative to the pipeline 34 in the fusion apparatus 30. As those skilled in the art will appreciate, coaxial movement of clamps 32 relative to jaws 33 along the pipeline axis 26 is constrained by the size and members used in the construction of the fusion apparatus 30.

After pipe section 23 is moved into the self propelled pipe fusion housing the machine operator positions same relative to the pipeline 34 in and the closes the clamps 32 by operating valves 39. The pipe and face shaving operation is performed using the shaving wheel 146. One beneficial result of my invention is that shavings from the pipe are collected within the housing. In the past, pipeline construction workers had to pick the shavings up from the right of way to avoid pollution. After face shaving, the operator applies the heating element to the end faces and presses the push to start button 60 (FIG. 4) causing the heating lamp to go on. When it times out, the operator removes the heating element, brings the end of pipe section 23 into contact with the facing end of the pipeline 34 allowing fusion, and he applies the heat dissipator band 38 to the joint to apply cooling air.

The cooling cycle is controlled automatically by the timers as previously described. In general, the application of cooling air reduces the amount of waiting time following a fusion operation by about one half. That is, natural cooling given an ambient of about 75° F. for eight inch pipe takes about three minutes whereas this time is reduced to about one and a half minutes using the heat dissipation band. Accordingly, the number of fusion joints which can be made using the self propelled fusion machine during a ten-hour working day is increased considerably over that produced by prior art apparatus and methods.

After the cooling cycle is completed the timer bell sounds and the operator removes the heat dissipation band 38 from the completed joint. The operator then energizes valves 132 and 134 to effect kickout of the pipeline 34 by rollers 80 and 82 from the fusion apparatus. The self propelled housing may then be moved along the right of way to receive another section of pipe 23.

What is claimed is:

1. A machine for making a pipeline from sections of plastic pipe comprising:
   a. a self-propelled housing, including an engine providing motive power;
   b. an electric generator mounted within said housing and driven by said engine;
   c. fusion apparatus mounted within said housing provided with a heating element energized from said generator to fuse plastic pipe sections together to form a joint;
   d. a pick-up trough extending from said housing and supported thereby equipped with spaced apart rollers to feed pipe sections serially to said fusion apparatus;
   e. a plurality of power operated clamps mounted on said fusion apparatus to hold a pipe section in mating relationship with another section of pipe;
   f. cooling apparatus connected to and energized by said generator to apply cooling air to a fusion joint;
   g. control means connected to operate said cooling apparatus for a set period of time;
   h. powered operated pipe lifting apparatus to elevate joined sections of pipe above said fusion apparatus;
   i. pipeline laying apparatus connected to said housing; and
   j. control apparatus driven by said engine to operate said pickup trough, pipeline laying apparatus, said clamps, and said pipe lifting apparatus, said control apparatus comprising hydraulically powered cylinders connected in a system to operate each element from a station located within said housing.

2. A machine for forming a pipeline out of sections of plastic pipe comprising:
   a. a single self propelled housing, including an engine providing motive power for said housing;
   b. an electric generator mounted within said housing and driven by said engine;
   c. fusion apparatus mounted within said housing having at least one electric resistance heating element for fusing sections of plastic pipe together inside the housing to form a joint, said fusion apparatus being connected to and energized by said generator; and,
   d. cooling apparatus energized by said generator to supply cooling air within said housing to a joint following fusion, said apparatus including an air conditioner carried by said housing to supply the cooling air, and a heat dissipater for applying the cooling air to the joint.

3. A machine for forming a pipeline according to claim 2 further comprising powered apparatus to facilitate movement of sections of pipe into said self-propelled housing and into said fusion apparatus.

4. A machine according to claim 2 further comprising apparatus to facilitate movement of completed pipeline rearwardly out of said housing, said apparatus including a pipeline laying device connected to be moved by and operated from said housing, said device being provided with adjustable means for laying the pipeline.

5. A machine according to claims 3 or 4 in which position control means are attached to said apparatus and operated from within said self propelled housing to adjust the apparatus for changes in the terrain in which the pipeline is laid.

6. A machine according to claim 5 wherein said position control means comprises a hydraulic system operated from a station located within said housing including hydraulically powered operating member attached to said apparatus.

7. A machine according to claim 3 in which said apparatus comprises a pickup boom or trough extending forwardly from said housing, and boom operator mechanism controlled from within said housing to adjust the position of said boom or trough to accept different sizes of pipe, said pickup boom being equipped with rollers to facilitate movement of pipe sections into said fusion apparatus.

8. A machine according to claim 7 in which said rollers are hydraulically powered.

9. A machine according to claim 4 in which said apparatus to facilitate movement of completed sections of pipeline out of said housing further comprises powered kickup rollers to lift the pipeline out of said fusion apparatus.

10. A machine according to claim 4 wherein said pipe laying device comprises a trailer connected by a flexible member to be towed by said machine, and means connected between said machine and said trailer to provide power to said adjustable means.

11. A machine according to claim 2 further comprising adjustable means located forwardly of said housing and supported thereby to feed sections of pipe to said fusion apparatus, a pipeline laying device connected to said housing to be moved thereby, said pipeline laying device including means for laying a completed pipeline, and power control means to operate said adjustable means relative to said pipe laying device to adjust for changes in the terrain in which the pipeline is constructed.

12. A machine according to claim 11 wherein said cooling apparatus is provided with control means to automatically cut the supply of cooling air to said heat dissipater after a predetermined period.

13. A machine according to claim 2 wherein the heat dissipater comprises a hollow pair of channels hinged on one end and connected to receive cooling air from a fan.

* * * * *